United States Patent [19]
Helms

[11] Patent Number: 5,832,238
[45] Date of Patent: Nov. 3, 1998

[54] ENABLING PCI CONFIGURATION SPACE FOR MULTIPLE FUNCTIONS

[75] Inventor: Frank P. Helms, Round Rock, Tex.

[73] Assignee: Advanced Micro Devices, Inc., Sunnyvale, Calif.

[21] Appl. No.: 733,998

[22] Filed: Oct. 18, 1996

[51] Int. Cl.$^6$ ..................................................... H01J 13/00
[52] U.S. Cl. .......................... 395/285; 395/281; 395/830; 395/831; 395/836; 395/834
[58] Field of Search ..................................... 395/281, 282, 395/283, 285, 287, 306, 308, 309, 500, 527, 828, 830, 831, 834, 836, 851, 856, 858, 882, 883

[56] References Cited

U.S. PATENT DOCUMENTS

| | | | |
|---|---|---|---|
| 5,586,268 | 12/1996 | Chen et al. | 395/250 |
| 5,590,313 | 12/1996 | Reynolds et al. | 395/500 |
| 5,608,876 | 3/1997 | Cohen et al. | 395/281 |
| 5,655,148 | 8/1997 | Richmand et al. | 395/828 |
| 5,680,556 | 10/1997 | Begun et al. | 395/311 |
| 5,689,730 | 11/1997 | Waksugi | 395/876 |

OTHER PUBLICATIONS

T. Shanley, D. Anderson, "PCI System Architecture," 3d ed, 1995, Addison Wesley, Reading, MA, US XP 002048504, pp. 73–75; p. 298, paragraph 5; and 299, paragrahp 1.

"Circuit for Detecting Disconnection and Connection of a Pluggable Unit," IBM Technical Disclosure Bulletin, vol. 36, No. 6b, Jun. 1993, Armonk, NY, XP 000377420, p. 371, paragraph 2, figure; p. 372.

"Bus Architecture with each Slot Capable of Multi–Function IDs," IBM Technical Disclosure Bulletin, vol. 34, No. 8, Jan. 1992, US, XP–002057688, pp. 192–193.

T. Shanley, "PCI System Architecture (Rev. 2.1 Compliant)," 2d e d. 1994, MindShare Press, p. 34, 238–241.

Messmer, Hans–Peter, *The Indispensable PC Hardware Book, Your Hardware Questions Answered*, Second Edition, ©1995 Addison–Wesley Publishing Company, Inc., New York, Chapter 22, pp. 513–510.

*PCI Local Bus Specification*, Revision 2.1 Production Version, Jun. 1, 1995, Chapter 2, §2.2.6, pp. 13–14, and Chapter 6 §6.1–6.7.3., pp. 185–218.

*Primary Examiner*—Ayaz R. Sheikh
*Assistant Examiner*—Raymond N. Phan
*Attorney, Agent, or Firm*—Skjerven, Morrill, MacPherson, Franklin & Friel, L.L.P.; Stephen A. Terrile

[57] ABSTRACT

A Peripheral Component Interconnect (PCI) compatible peripheral device for coupling to a PCI bus, the peripheral device comprising a primary function component and a connection portion. The primary function includes a PCI interface for coupling to the PCI bus, and a primary configuration space coupled to the PCI interface and accessible by the PCI bus via the PCI interface. The connection portion is coupled to the primary function component and supports a secondary function component. The primary function component provides PCI bus access via the PCI interface to the secondary function component when the secondary function component is coupled to the connection portion. The primary function component provides PCI bus access via the PCI interface to a secondary configuration space when the secondary function component is coupled to the connection portion.

33 Claims, 5 Drawing Sheets

5,832,238

ENABLING PCI CONFIGURATION SPACE FOR MULTIPLE FUNCTIONS

BACKGROUND OF THE INVENTION

1. Field of the Invention

The present invention relates to personal computer systems; and, more particularly, to personal computer systems having a Peripheral Component Interconnect (PCI) bus architecture.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices.

Personal computer systems usually operate according to one of several different bus architectures. For example, Industry Standard Architecture (ISA) provides a specification for the 16-bit IBM AT, and Enhanced ISA (EISA) and Micro Channel Architecture (MCA) provide specifications for the expansion bus in many systems that use the 386 and 486 32-bit microprocessors. In 1992, the Peripheral Component Interconnect (PCI) architecture was introduced. The PCI bus architecture was later upgraded and now presents a high-end bus solution for powerful personal computer systems. The PCI architecture provides a 32-bit or 64-bit interconnection system independent of processor generation or family.

A wide variety of chips with specialized functions have been developed to interface to buses that conform to the PCI architecture including video, Small Computer System Interface (SCSI) controllers, Local Area Network (LAN) adapters, and audio and video for multimedia systems. While, ideally, these functions are integrated onto the motherboard, the functions are often constructed as expansion cards that may be connected to an expansion bus such as a PCI bus. For example, PCI slots are often used to connect an audio and motion video expansion card.

The PCI bus architecture incorporates its configuration information in each PCI device. That is, a configuration space of 256 bytes is provided for every PCI compatible unit (and every separate function in a multifunction unit). All PCI devices must implement this configuration space. The configuration space consists of configuration registers that provide a PCI based system information about a PCI device, and allow the device to be configured for use in a specific system. A device's configuration space must be accessible at all times, not just during system boot.

The configuration space is divided into a predefined header region and a device dependent region. The predefined header region includes fields that uniquely identify the device and allow the device to be generically controlled. One piece of information that the configuration space header provides is a class code which identifies the function of the system. The configuration space also provides a header field, one bit of which indicates the presence of a multifunctional PCI device.

As mentioned, the PCI architecture allows for PCI devices with more than one function. Multifunction PCI devices provide a configuration space for each function implemented; that is, each function has its own set of configuration space registers. For example, a PCI device with both a SCSI bus controller (class code 010000h) and an Institute of Electrical and Electronic Engineers (IEEE) 1394 serial bus controller (class code 0C0000h) would be considered a multifunction PCI device. Such a device would have two configuration spaces, one for the SCSI bus controller and one for the IEEE 1394 serial bus controller. A multifunction device is identified by the need for more than one interrupt pin on the device. Respective multiple configuration spaces are necessary when multiple interrupt pins are required by the multifunction device.

When providing a multifunction PCI device, it may be desired to package each function separately and only have a PCI bus interface on one of the functions so that the other function(s) can be options and installed at the manufacturer's or buyer's discretion. Such a configuration can reduce the cost associated with implementing a full PCI bus interface for each function if the other functions are attached through some non-PCI bus interface to the primary function. Such a configuration also provides the benefit, for example, that a system would only have to implement desired function(s) and would save the cost associated with the functions that were not needed or wanted. Additionally, the system to which the multifunction device is coupled would have fewer loads on the PCI bus if multiple functions are implemented. Additionally, different transistor densities could be used for the different functions (e.g., the function with the PCI interface could be fabricated with a density of 0.35 microns, and one of the other functions could be fabricated with a lower cost 0.7 micron density).

In the case of separately packaged functions, the function packaged with the PCI bus interface accesses PCI bus transactions intended for any of the other functions coupled thereto. A device should only claim configuration bus transactions intended for other functions if they are present in the system, and should not claim configuration bus transactions intended for functions that are not present.

SUMMARY OF THE INVENTION

It has been discovered that multiple functions may be optionally provided via a single PCI interface by providing a primary function unit through which a secondary function unit accesses the PCI bus when the primary function unit determines that a secondary function unit is present. Such a configuration advantageously allows each function to be packaged separately with a PCI bus interface on only one of the functions so that other functions can be options and installed at the manufacturer's or buyer's discretion. Such a configuration also provides the advantage of reducing the cost associated with implementing a full PCI bus interface for multiple functions. Such a configuration also provides the advantage of only having to implement desired function (s) and thus saving the cost associated with the functions that are not needed or wanted. Additionally, the system to which the multifunction device is coupled drives fewer PCI loads. Additionally, the multiple functions can be fabricated with different transistor densities.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the preferred embodiments. The description is intended to be illustrative of the invention and should not be taken to be limiting. Many variations, modifications, additions, and improvements may fall within the scope of the invention as defined in the claims which follow.

Figure 1:
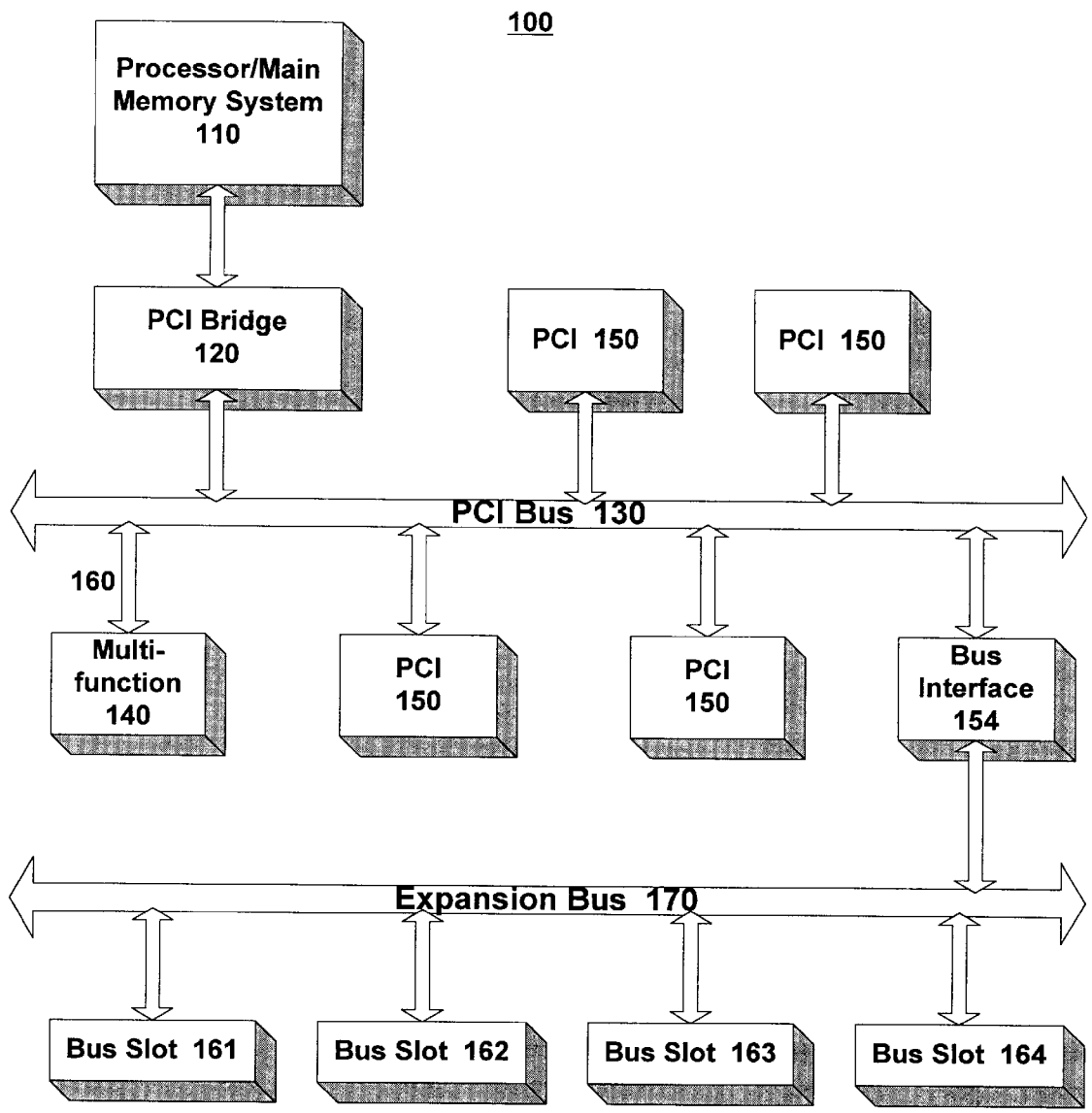
FIG. 1 shows a computer system including a PCI bus and a multifunction-capable PCI device in accordance with the present invention.

Referring to FIG. 1, an exemplary computer system 100 with PCI bus 130 is shown. Computer system 100 includes a processor/main memory system 110 which is coupled to PCI bus 130 via PCI bridge 120. Optionally, various PCI compatible units 150 may be coupled to PCI bus 130. PCI units 150 may include a LAN adapter, an I/O unit, a graphics adapter, and multimedia expansion, among other functions. Expansion bus interface 154 is coupled to PCI bus 130. Expansion bus interface 154 allows a standard expansion bus 170 (such as an ISA bus, an EISA bus or a MCA bus) to be accessed by the PCI bus as if expansion bus 170 were another PCI device. Computer system 100 also includes a multifunction-capable PCI device 140 which is coupled to PCI bus 130 via PCI interface 160.

The PCI interface 160 of multifunction-capable PCI device 140 includes interrupt signal connections for each function that is potentially present in multifunction-capable PCI device 140. Multifunction-capable PCI device 140 determines whether multiple functions are present within the device and only enables a PCI configuration space for those functions that are present. Accordingly, when computer system 100 is initialized, it only detects and accesses those functions that are present within multifunction-capable PCI device 140.

Multifunction-capable PCI device 140 is capable of providing at least one of several functions. Multifunction-capable PCI device 140 may provide multiple functions directly. Alternatively, multifunction-capable PCI device 140 may provide a function directly and provide other functions indirectly through an appropriate interface. Functions that are packaged with the PCI bus interface component are referred to as primary functions. Additional functions that are packaged separately from the primary function component are referred to as secondary functions.

Figure 2:
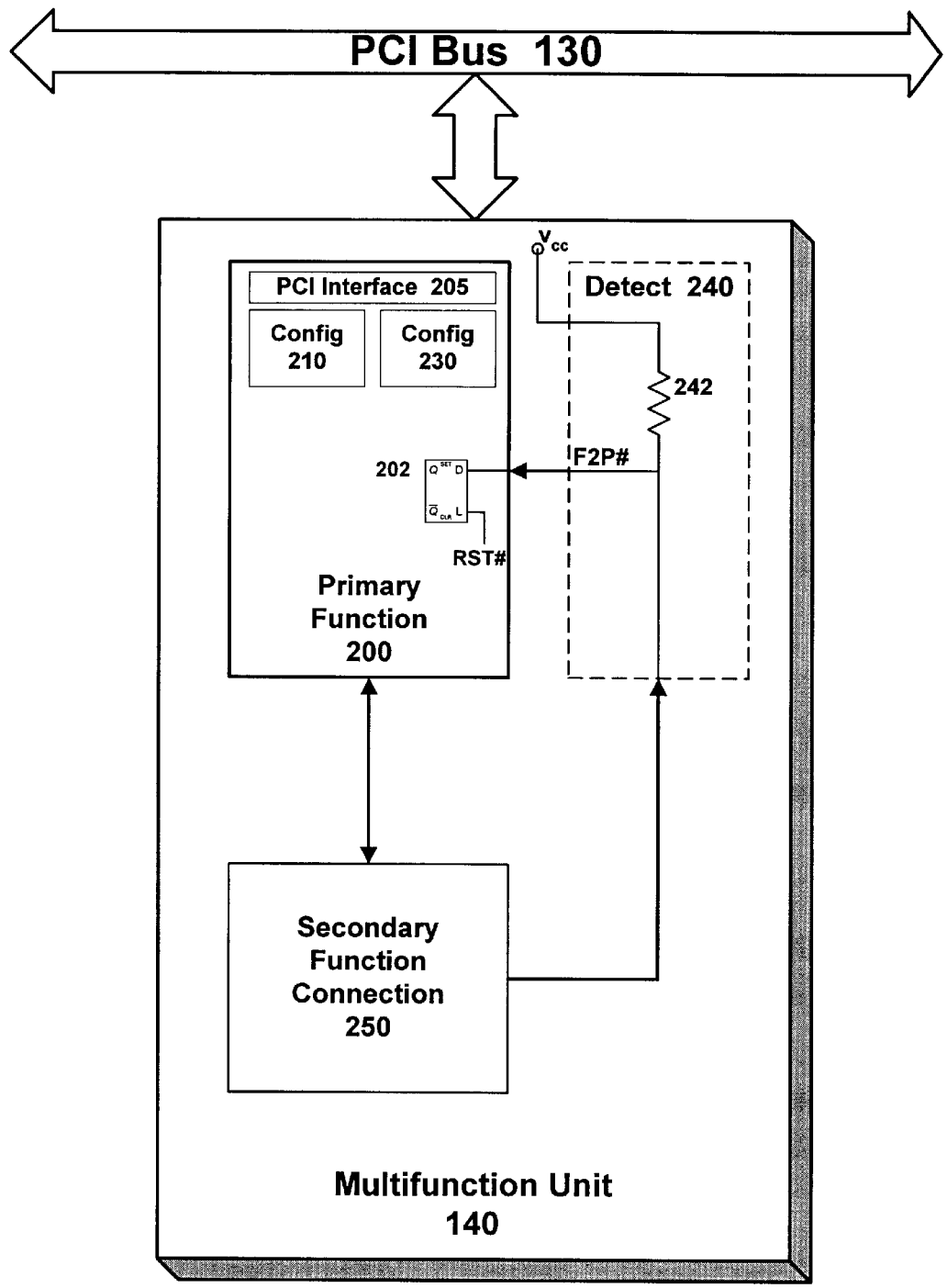
FIG. 2 shows a multifunction-capable PCI device which provides only one function in accordance with the present invention.

Referring to FIG. 2, multifunction-capable PCI device 140 includes a primary function component 200 which is coupled to computer system 100 via PCI interface 205, PCI bus 130 and PCI bridge 120. Multifunction-capable PCI device 140 includes a secondary function connection portion 250 for electrically coupling a secondary function component to multifunction-capable PCI device 140. Multifunction-capable PCI device 140 includes detect circuit 240 which is coupled between primary function component 200 and connection portion 250. Multiple function detect circuit 240 provides secondary function present signal F2P# to the secondary function present input of primary function component 200.

In the preferred embodiment, a respective connection portion 250 is provided for each potential secondary function capable of being coupled to multifunction-capable PCI device 140. It is appreciated that although the preferred embodiment has one secondary function connection portion, multifunction-capable PCI device 140 may comprise more than one secondary function connection portion.

Primary function component 200 includes a primary configuration space 210 for its primary function. In the preferred embodiment, primary function component 200 also has at least one secondary configuration space 230 for a secondary function component that may be coupled to multifunction-capable PCI device 140, at the discretion of the system manufacturer or user. Alternatively, secondary configuration space 230 may be included with the secondary function component as long as secondary configuration space 230 is accessible to PCI bus 130 when a secondary function component is coupled to multifunction-capable PCI device 140. Primary function component 200 also includes latch 202.

Figure 3:
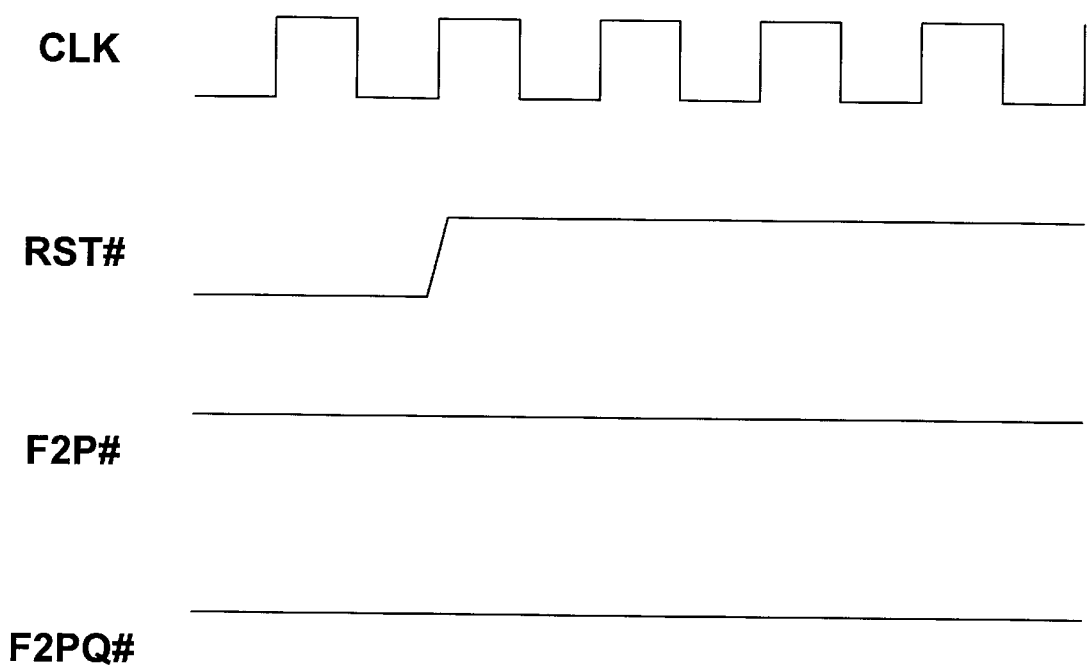
FIG. 3 shows a timing diagram of the detection circuit of FIG. 2.

Referring to FIGS. 2 and 3, primary function component 200 includes a secondary function present input terminal which receives secondary function present signal F2P# from multiple function detect circuit 240. In the preferred embodiment, multiple function detect circuit 240 connects the secondary function present input to $V_{cc}$ via a resister 242. Latch 202 receives secondary function present signal F2P# at its data input and PCI bus reset signal RST# at its enable input. When PCI reset signal RST# goes high, latch 202 holds F2P# at its output. Because no secondary function component is present, secondary function present signal F2P# is high. Because F2P# is high, latch 202 output F2PQ# is also high, thereby indicating to multifunction-capable PCI device 140 that no secondary function is present. Therefore, multifunction-capable PCI device 140 does not allow secondary configuration space 230 to be accessed by processor/main memory system 110 or any other PCI bus master. Thus, multifunction-capable PCI device 140 ignores PCI bus transactions intended for secondary functions that are not attached.

Figure 4:
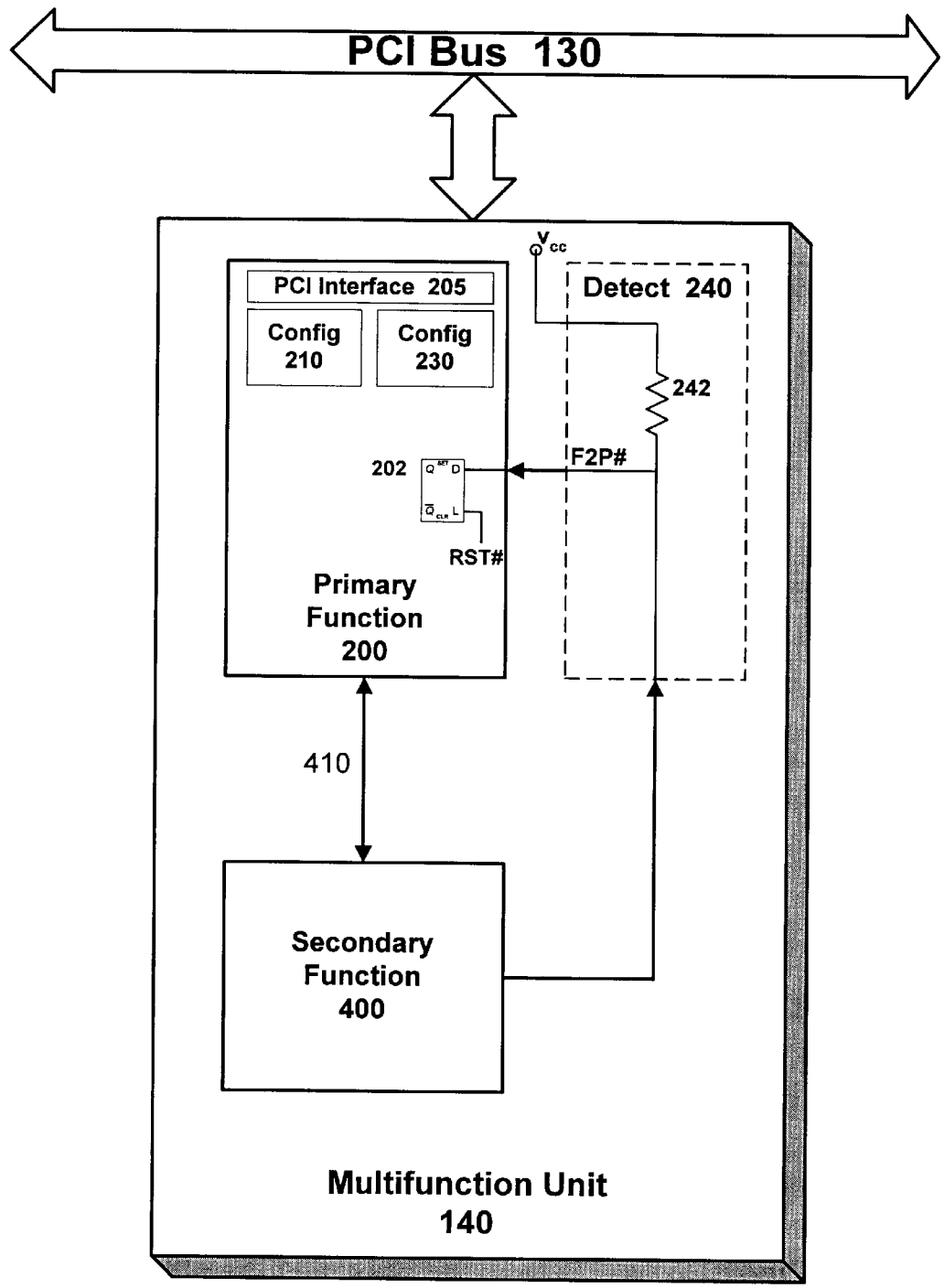
FIG. 4 shows a multifunctional PCI device which provides two functions in accordance with the present invention.

Referring to FIG. 4, a secondary function component 400 is connected to secondary function connection portion 250. Secondary function component 400 is thereby coupled to multifunction-capable PCI device 140. Secondary function component 400 is coupled to primary function component 200 via any appropriate bus 410. Bus 410 may be of any type as long as data and other information can pass between primary function component 200 of multifunction-capable PCI device 140 and secondary function component 400. The most significant header bit (bit 7) of the header type register in configuration space 210 is set high (bit 7=1) to indicate that a secondary function is present. Secondary function component 400 may or may not be PCI compatible. Also, secondary function component 400 may or may not be fabricated with the same transistor densities. It is appreciated that although the preferred embodiment has one secondary function, more than one secondary function may be coupled to multifunction-capable PCI device 140.

Figure 5:
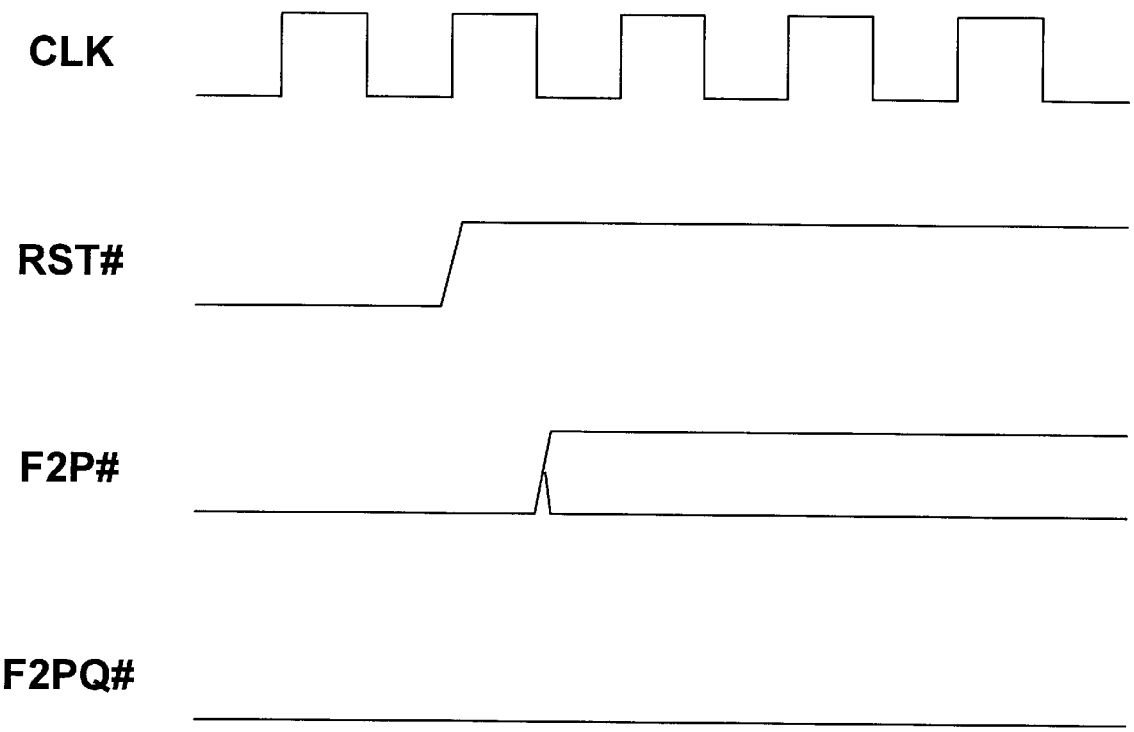
FIG. 5 shows a timing diagram of the detection circuit of FIG. 4.

Referring to FIGS. 4 and 5, when present, secondary function component 400 pulls F2P# low, thus pulling secondary function present input F2P# low, thereby indicating to multifunction-capable PCI device 140 that secondary function component 400 is present. When secondary function component 400 is present, multifunction-capable PCI device 140 makes the secondary configuration space 230 available to PCI bus 130. Also when secondary function component 400 is present, multifunction-capable PCI device 140 claims the PCI bus configuration cycles intended for secondary function component 400. If more than one type of secondary function component 400 may be attached, then a secondary function present input F2P# is provided for each potential secondary function 400. Because each secondary function present input F2P# is sourced from a different potential secondary function 400, the secondary function present input F2P# also indicates the type of secondary function component 400 that is present. Accordingly, multifunction-capable PCI device 140 claims only those configuration access cycles, shows only those configuration spaces and utilizes only those interrupts corresponding to the secondary functions 400 that are attached to multifunction-capable PCI device 140.

Referring to FIGS. 2 through 5, the method for informing primary function component 200 of the presence of secondary function component 400 is for primary function 200 to latch the state of one of the interface signals between primary function component 200 and secondary function component 400 (or an unused pin) on the rising edge of the PCI reset signal, RST#. In the preferred embodiment, latch 202 receives secondary function present input F2P#. Latch 202 is transparent when RST# is low. On the rising edge of RST#, latch 202 holds the value of F2P# at its output F2PQ# for primary function 200.

Sampled pin F2P# may be a pin already in the functional architecture, or a special purpose pin. In the preferred embodiment, if the pin F2P# is sampled low (logic 0), then secondary function component 400 is present. If the pin F2P# is sampled high (logic 1), then secondary function component 400 is not present. If there is more than one secondary function that can be attached to primary function component 200, then a unique pin is sampled for each possible secondary function. The version of the signal that is latched on the rising edge of RST# will be used by logic within primary function component 200 to determine if PCI bus transactions to secondary configuration space 230, and subsequently to secondary function component 400, should be claimed.

While the invention has been described with reference to various embodiments, it will be understood that these embodiments are illustrative and that the scope of the invention is not limited to them. Many variations, modifications, additions, and improvements of the embodiments described are possible. Those skilled in the art will recognize that the boundaries between logic blocks are merely illustrative and alternative embodiments may merge blocks or impose an alternate decomposition of functionality for secondary function notice logic. For example, configuration space 230 is shown to be part of primary function component 200. It is appreciated that the configuration space 230 may be separate from primary function component 200 on multifunction-capable PCI device 140. It is understood that multiple secondary functions 400, although not shown, are contemplated by the invention. Also, it will be appreciated that alternate detection circuits may be used. Also, it will be appreciated that any known connection technology could be used for connection portion 250, such technology including but not limited to a connector, a socket, or pads to which a device may be soldered. These and other variations, modifications, additions, and improvements may fall within the scope of the invention as defined in the claims which follow.

What is claimed is:

1. A PCI compatible peripheral device for coupling to a PCI bus, the peripheral device comprising:
   a primary function component including:
      a PCI interface for coupling to the PCI bus, and
      a primary configuration space coupled to the PCI interface and accessible by the PCI bus via the PCI interface; and,
   a connection portion coupled to the primary function component, the connection portion supporting a secondary function component, the primary function component providing PCI bus access via the PCI interface to the secondary function component when the secondary function component is coupled to the connection portion, the primary function component providing PCI bus access via the PCI interface to a secondary configuration space when the secondary function component is coupled to the connection portion; wherein
      the primary function component accesses bus transactions intended for the primary function component; and,
      the primary function component accesses bus transactions intended for the secondary function component if the secondary function component is coupled to the connection portion.

2. The peripheral device of claim 1, further comprising:
   the secondary function component, the secondary function component being coupled to the connection portion, the primary function component providing PCI bus access via the PCI interface to the secondary function component.

3. The peripheral device of claim 1 further comprising:
   a detection circuit coupled to the primary function component and the connection portion, the detection circuit detecting whether a secondary function component is coupled to the connection portion, the detection circuit indicating to the primary function component whether the secondary function component is coupled to the connection portion.

4. The peripheral device of claim 1 wherein the secondary configuration space is located within the primary function component.

5. The peripheral device of claim 1 wherein the secondary configuration space is located within the secondary function component.

6. The peripheral device of claim 1 wherein
   the connection portion is a socket for receiving a secondary function packaged as an integrated circuit, and wherein a respective socket is provided for each secondary function component supported by the peripheral device.

7. The PCI compatible peripheral device of claim 1 coupled into a computer system, the computer system including the PCI bus.

8. The peripheral device of claim 1 wherein
a signal indicating a presence of the secondary function component is held to a first logic level when the secondary function component is not coupled to the connection portion; and
the signal indicating the presence of the secondary function component is held to a second logic level by the secondary function component when the secondary function component is coupled to the connection portion.

9. The peripheral device of claim 3 wherein the primary function component further comprises:
a latch for latching a signal received from the detection circuit, the signal indicating presence of the secondary function component to the primary function component, the latch latching the signal upon actuation of the peripheral device.

10. A PCI compatible peripheral device for coupling to a PCI bus, the peripheral device comprising:
a primary function component including:
a PCI interface for coupling to the PCI bus, and
a primary configuration space coupled to the PCI interface and accessible by the PCI bus via the PCI interface;
a connection portion coupled to the primary function component, the connection portion supporting a secondary function component, the primary function component providing PCI bus access via the PCI interface to the secondary function component when the secondary function component is coupled to the connection portion, the primary function component providing PCI bus access via the PCI interface to a secondary configuration space when the secondary function component is coupled to the connection portion;
a detection circuit coupled to the primary function component and the connection portion, the detection circuit detecting whether a secondary function component is coupled to the connection portion, the detection circuit indicating to the primary function component whether the secondary function component is coupled to the connection portion;
wherein the detection circuit comprises:
an input terminal for receiving a first signal from the connection portion;
an output terminal for providing a second signal to the primary function component; and
a resister including a first node coupled to the input terminal and the output terminal, and a second node coupled to a first voltage source providing a first voltage, the first resister node being forced to the first voltage when the secondary function component is not coupled to the connection portion, the first resister node being forced to a second voltage when the secondary function component is coupled to the connection portion, the second signal set at the voltage of the first resister node.

11. A PCI compatible peripheral device for coupling to a PCI bus, the peripheral device comprising:
a primary function component including:
a PCI interface for coupling to the PCI bus, and
a primary configuration space coupled to the PCI interface and accessible by the PCI bus via the PCI interface;
a connection portion coupled to the primary function component, the connection portion supporting a secondary function component, the primary function component providing PCI bus access via the PCI interface to the secondary function component when the secondary function component is coupled to the connection portion, the primary function component providing PCI bus access via the PCI interface to a secondary configuration space when the secondary function component is coupled to the connection portion;
a detection circuit coupled to the primary function component and the connection portion, the detection circuit detecting whether a secondary function component is coupled to the connection portion, the detection circuit indicating to the primary function component whether the secondary function component is coupled to the connection portion; wherein
the primary function component further comprises a latch for latching a signal received from the detection circuit, the signal indicating presence of the secondary function component to the primary function component, the latch latching the signal upon actuation of the peripheral device;
the signal indicating the presence of the secondary function component is held to a logic high by the voltage source when the secondary function component is not coupled to the connection portion;
the signal indicating the presence of the secondary function component is held to a logic low by the secondary function component when the secondary function component is coupled to the connection portion; and,
the signal indicating the presence of the secondary function is latched by the latch on the rising edge of a peripheral reset signal.

12. A computer system comprising:
a PCI bus; and,
a PCI compatible peripheral device coupled to the PCI bus, the peripheral device including a primary function component, the primary function component including a primary function configuration space, a secondary function configuration space, and a PCI interface, the peripheral device supporting a secondary function component, the primary function configuration space being accessible by the PCI bus, the secondary function configuration space being accessible by the PCI bus when a corresponding secondary function component is coupled to the primary function component, the secondary function component accessing the PCI bus via the primary function component when the corresponding secondary function component is coupled to the primary function component, the primary function component accessing bus transactions intended for the primary function component, and the primary function component accessing bus transactions intended for the secondary function component if the secondary function component is coupled to the primary function component.

13. The computer system of claim 12 wherein the peripheral device further comprises:
a connection portion coupled to the primary function component and coupled to receive the secondary function component.

14. The computer system of claim 13 wherein the peripheral device further comprises:
the secondary function component, the secondary function component being coupled to the connection portion, the primary function component providing PCI bus access via the PCI interface to the secondary function component.

15. The computer system of claim 13 wherein the peripheral device further comprises:
a detection circuit coupled to the primary function component and the connection portion, the detection circuit for detecting whether a secondary function component is coupled to the connection portion, the detection circuit indicating to the primary function component whether the secondary function component is coupled to the connection portion.

16. The computer system of claim 13 wherein
the connection portion is a socket for receiving a secondary function packaged as an integrated circuit, and wherein a respective socket is provided for each secondary function component supported by the peripheral device.

17. The computer system of claim 15 wherein the detection circuit comprises:
an input terminal for receiving a first signal from the connection portion;
an output terminal for providing a second signal to the primary function component; and
a resister including a first node coupled to the input terminal and the output terminal, and a second node coupled to a first voltage source providing a first voltage, the first resister node being forced to the first voltage when the secondary function component is not coupled to the connection portion, the first resister node being forced to a second voltage when the secondary function component is coupled to the connection portion, the second signal set at the voltage of the first resister node.

18. The computer system of claim 15 wherein the primary function component further comprises:
a latch for latching a signal received from the detection circuit, the signal indicating to the primary function component that the secondary function component is coupled to the connection portion, the latch latching the signal upon actuation of the peripheral device.

19. The computer system of claim 18 wherein
the signal indicating the presence of the secondary function is held to a logic high by the voltage source when the secondary function component is not coupled to the connection portion;
the signal indicating the presence of the secondary function is held to a logic low by the secondary function component when the secondary function component is coupled to the connection portion; and,
the signal indicating the presence of the secondary function is latched by the latch on the rising edge of a peripheral reset signal.

20. A computer system comprising:
a processor;
a PCI bus coupled to the processor; and,
a PCI compatible peripheral device coupled to the PCI bus, the peripheral device including:
a primary function component including:
a primary function configuration space,
a secondary function configuration space, and
a PCI interface; and,
a connection portion for coupling a secondary function component to the primary function component, the connection portion coupled to the primary function component; wherein the primary function configuration space is accessible to the PCI bus;
the secondary function configuration space is accessible to the PCI bus when a corresponding secondary function component is coupled to the primary function component, the secondary function component accessing the PCI bus via the primary function component when the secondary function component is coupled to the primary function component;
the primary function component accesses bus transactions intended for the primary function component; and
the primary function component accesses bus transactions intended for the secondary function component if the secondary function component is coupled to the primary function component.

21. The computer system of claim 20 wherein the peripheral device further comprises a detection circuit coupled to the primary function component and the connection portion, the detection circuit for detecting whether a secondary function component is coupled to the primary function component via the connection portion, the detection circuit indicating to the primary function component whether a secondary function component is coupled to the primary function component.

22. The computer system of claim 20, further comprising:
the secondary function component coupled to the primary function component, the secondary function configuration space being accessible by the PCI bus via the primary function component.

23. The computer system of claim 22 wherein the peripheral device further comprises a detection circuit coupled to the primary function component and the connection portion, the detection circuit for detecting whether a secondary function component is coupled to the primary function component via the connection portion, the detection circuit indicating to the primary function component whether a secondary function component is coupled to the primary function component.

24. The computer system of claim 21 wherein the detection circuit comprises:
an input terminal for receiving a first signal from the connection portion;
an output terminal for providing a second signal to the primary function component; and
a resister including a first node coupled to the input terminal and the output terminal, and a second node coupled to a first voltage source providing a first voltage, the first resister node being forced to the first voltage when the secondary function component is not coupled to the connection portion, the first resister node being forced to a second voltage when the secondary function component is coupled to the connection portion, the second signal set at the voltage of the first resister node.

25. The computer system of claim 21 wherein
a signal indicating a presence of the secondary function is held to a first logic level when the secondary function component is not coupled to the connection portion; and
the signal indicating the presence of the secondary function is held to a second logic level by the secondary function component when the secondary function component is coupled to the connection portion.

26. The computer system of claim 24 wherein the primary function component further comprises:
a latch for latching a signal received from the detection circuit, the signal indicating a presence of the secondary function component to the primary function component, the latch latching the signal upon actuation of the peripheral device.

27. The computer system of claim 26 wherein the signal indicating the presence of the secondary function is held to a logic high by the voltage source when the secondary function component is not coupled to the connection portion;

the signal indicating the presence of the secondary function is held to a logic low by the secondary function component when the secondary function component is coupled to the connection portion; and, the signal indicating the presence of the secondary function is latched by the latch on the rising edge of a peripheral reset signal.

28. A method of providing multiple function capability via a single PCI interface comprising the steps of:

providing a first function component on a PCI compatible peripheral device, the first function component including a PCI bus interface, a first function configuration space and a second function configuration space;

providing a connection portion coupled to the first function component, the connection portion for supporting a second function component;

detecting whether a second function component is coupled to the connection portion; and accessing with the second function component the PCI bus via the PCI bus interface if the second function component is coupled to the connection portion;

wherein the first function configuration space is accessible by the PCI interface; and the second function configuration space is accessible by the PCI interface if the second function component is coupled to the connection portion.

29. The method of claim 28 wherein the first function component accesses bus transactions intended for the first function component; and the first function component accesses bus transactions intended for the second function component if the second function component is coupled to the connection portion.

30. The method of claim 29 wherein access to the second configuration space by the PCI interface is prevented if the second function component is not coupled to the first function component.

31. A method of providing multiple function capability via a single PCI interface comprising the steps of:

providing a first function component on a PCI compatible peripheral device, the first function component including a PCI bus interface;

providing a connection portion coupled to the first function component, the connection portion for supporting a second function component;

detecting whether a second function component is coupled to the connection portion; and accessing with the second function component the PCI bus via the PCI bus interface if the second function component is coupled to the connection portion;

wherein the first function component includes a first configuration space;

the second function component includes a second configuration space;

the first configuration space is accessible by the PCI interface; and the second configuration space is accessible by the PCI interface if the second function component is coupled to the first function component.

32. A method of providing multiple function capability via a single PCI interface comprising the steps of:

providing a first function component on a PCI compatible peripheral device, the first function component including a PCI bus interface, a first function configuration space and a second function configuration space;

providing a connection portion coupled to the first function component, the connection portion for supporting a second function component;

detecting whether a second function component is coupled to the connection portion; and accessing with the second function component the PCI bus via the PCI bus interface if the second function component is coupled to the connection portion;

wherein the first function configuration space is accessible by the PCI interface; and the second function configuration space is accessible by the PCI interface if the second function component is coupled to the first function component.

33. A method of providing multiple function capability via a single PCI interface comprising the steps of:

providing a first function component on a PCI compatible peripheral device, the first function component including a PCI bus interface, a first function configuration space and a second function configuration space;

providing a connection portion coupled to the first function component, the connection portion for supporting a second function component;

detecting whether a second function component is coupled to the connection portion; and accessing with the second function component the PCI bus via the PCI bus interface if the second function component is coupled to the connection portion;

wherein the detecting whether the second function component is coupled to the connection portion is performed by an indicator circuit comprising:

an input receiving a first signal from the connection portion;

an output providing a second signal to the first function component; and a resister including a first node coupled to the input and the output, and a second node coupled to a first voltage source providing a first voltage, the first resister node forced to the first voltage when the second function component is not coupled to the connection portion, the first resister node forced to a second voltage when the second function component is coupled to the connection portion, the second signal set at the voltage of the first resister node.

* * * * *